Jan. 26, 1954  D. A. ZAFFINA  2,667,212
LEVER ACTUATED TIRE BEAD LOOSENING DEVICE
Filed Jan. 22, 1952  2 Sheets-Sheet 1

Dominic A. Zaffina
INVENTOR.

Jan. 26, 1954      D. A. ZAFFINA      2,667,212
LEVER ACTUATED TIRE BEAD LOOSENING DEVICE
Filed Jan. 22, 1952      2 Sheets-Sheet 2
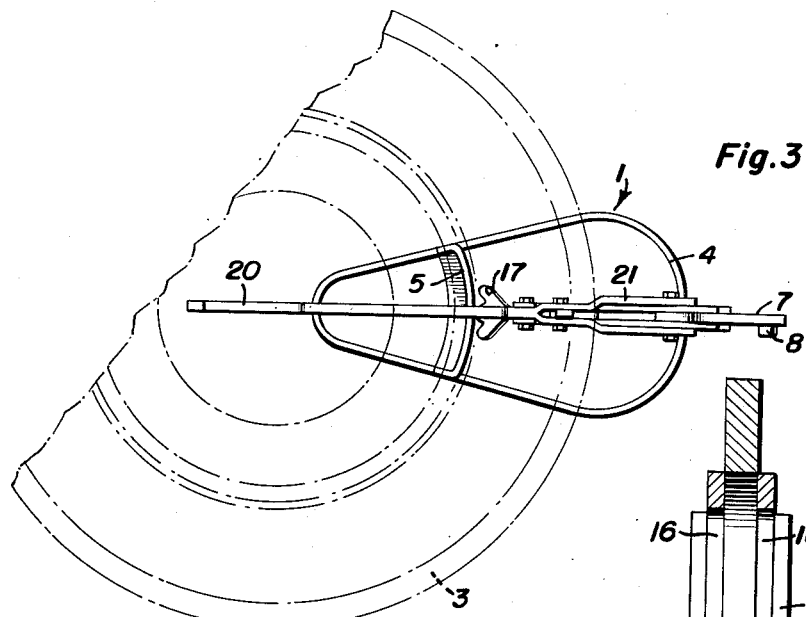
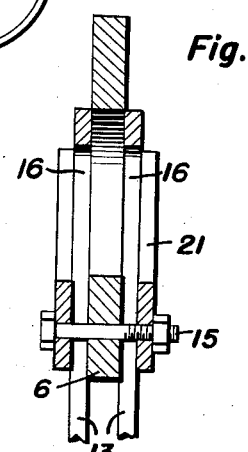
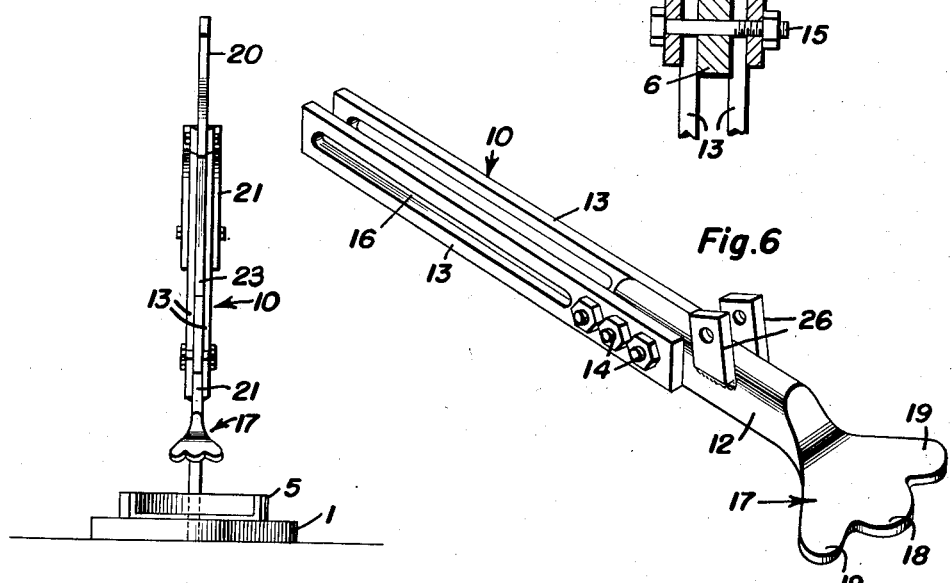
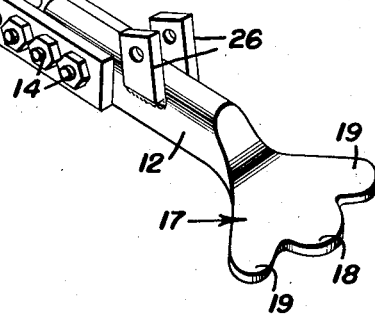
Dominic A. Zaffina
INVENTOR.

Patented Jan. 26, 1954

2,667,212

UNITED STATES PATENT OFFICE 2,667,212

LEVER ACTUATED TIRE BEAD LOOSENING DEVICE

Dominic A. Zaffina, Pontiac, Mich., assignor to said Dominic A. Zaffina and Josephine F. Zaffina, Pontiac, Mich., jointly Application January 22, 1952, Serial No. 267,563

1 Claim. (Cl. 157—1.26)

My invention relates to improvements in devices for freeing the bead portions of a pneumatic tire from the conventional tire retaining rim preparatory to removing the tire from the rim.

The primary object of my invention is to provide a lever operated device for easily freeing the bead portions of such a tire from the flanged edges of a tire retaining rim without danger of the device slipping and damaging the side walls of the tire or injuring the operator.

Another object is to provide a device for the above purposes in which a single compression lever is operated to exert pressure downwardly against the side wall of the tire at the bead portion and to slide between the rim flange and the bead portion to break the adhesion between said flange and bead portion quickly and easily.

Still another object is to provide a device for the above purposes which is simple in construction, easy to operate, readily portable, safe and comparatively inexpensive to manufacture.

Other and subordinate objects, within the purview of my invention, together with the precise nature of my improvements will be readily understood when the succeeding description and claim are read with reference to the drawings accompanying and forming part of this specification.

In said drawings:

Figure 3 is a fragmentary view in plan;

Figure 4 is a view in rear elevation;

Figure 5 is a fragmentary view in section taken on the line 5—5 of Figure 2 and drawn to a larger scale, and Figure 6 is a view in perspective of the compression lever drawn to a larger scale.

Figure 1:
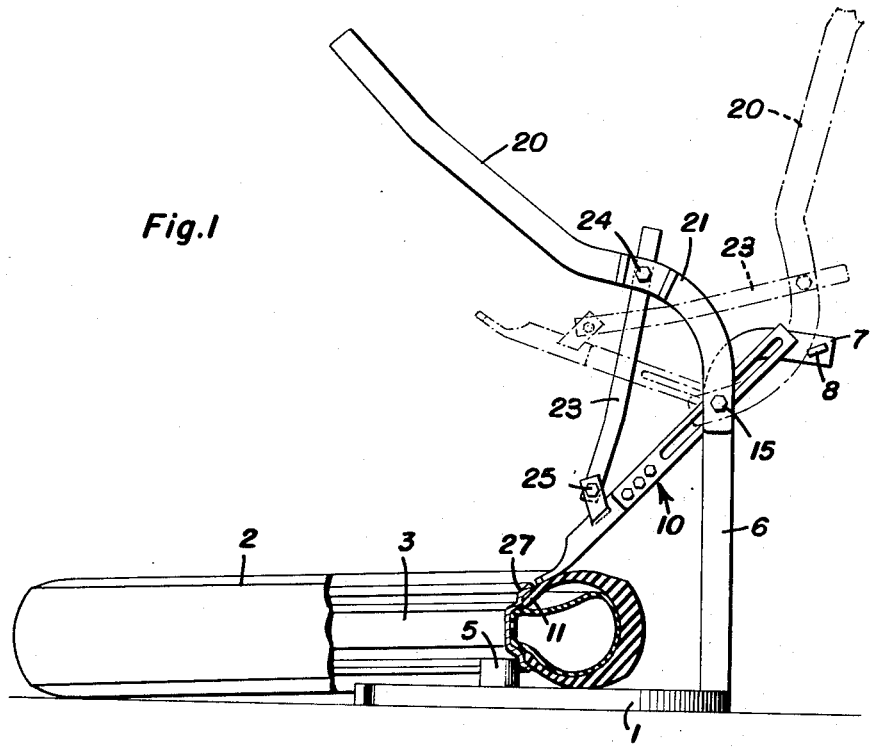
Figure 1 is a view in side elevation, partly in transverse section, illustrating my improved device with the parts positioned ready for use against one side of a tire adjacent to the bead portion.

Referring to the drawings by numerals, my improved device, in the illustrated embodiment thereof, comprises an elongated, tapered, base frame 1 of a suitable length for positioning on a floor, or the like, under a tire 2 and rim 3 to extend endwise radially thereof smaller end innermost and support said tire and rim at one side thereof with the larger end 4 of the frame extending outwardly beyond the tire 2.

The frame 1 is preferably formed of a single piece of bar metal. An arcuate cross-member 5 on top of the frame 1 and suitably fixed thereto is adapted to fit under and support the rim 3 so as to prevent the tire 2 from engaging the frame 1 and being injured thereby.

A metal post 6 is suitably fixed to the larger end 4 of the frame 1 in the longitudinal center of said frame with an upper end 7 curving outwardly of the larger end 4 of the frame 1 and provided with a lateral stop lug 8 for a purpose presently seen.

A bifurcated tire compressing lever 10 is pivotally and slidably mounted on the post 6, adjacent the upper end of said post, and in a manner presently described, for vertical swinging downwardly against the uppermost side wall of the tire adjacent the bead portion 11, and for endwise sliding toward the rim 3. The lever 10 comprises a bar 12 at one end thereof having a pair of laterally spaced, longitudinally slotted, bars 13 bolted, as at 14, to opposite sides of the bar 12 parallel to said bar 12 and which straddle the post 6 and form the bifurcation of said lever 10. A pivot bolt 15 extends through the post 6 and slots 16 in the bars 13 and together with said slotted bars 13 forms the pivotal and slidable mounting for said lever 10. As will be noted, the lever 10 is constructed and arranged to incline downwardly from the post 6 over the tire 2 when engaged with the uppermost side wall of said tire. The lever 10 is provided on the other end of the bar 12 with a wide, flat member 17 for engagement with the sidewall of the tire 2 and which is formed with a scalloped front edge providing a central lug 18 on said member 17 and a pair of lugs 19 on said member at opposite sides of the lug 18 set back from the lug 18 so that the same are shorter than the lug 18 and serve a purpose presently described.

A hand lever 20 is provided for swinging the compression lever 10, said hand lever 20 having a bifurcated end 21 pivoted on the bolt 15 for vertical swinging of said lever 20 into and from overlying relation to the base frame 1 and tire 2. A link 23 depending from the hand lever 20 is pivoted at one end in the bifurcated end of said lever 20, as at 24, with its other end pivoted, as at 25 between a pair of ears 26 on the bar 12 of the lever 10 between the slots 16 and said flat member 17, said link operatively connecting the hand lever 20 to the compression lever 10 so that vertical swinging of the hand lever 20 into and from overlying relation to the base frame 1 and tire 2 will swing the compression lever downwardly and upwardly. Swinging movement of the hand lever 20 from overlying position relative to the base frame 1 and tire 2 is limited by the stop lug 8 previously mentioned.

Figure 2:
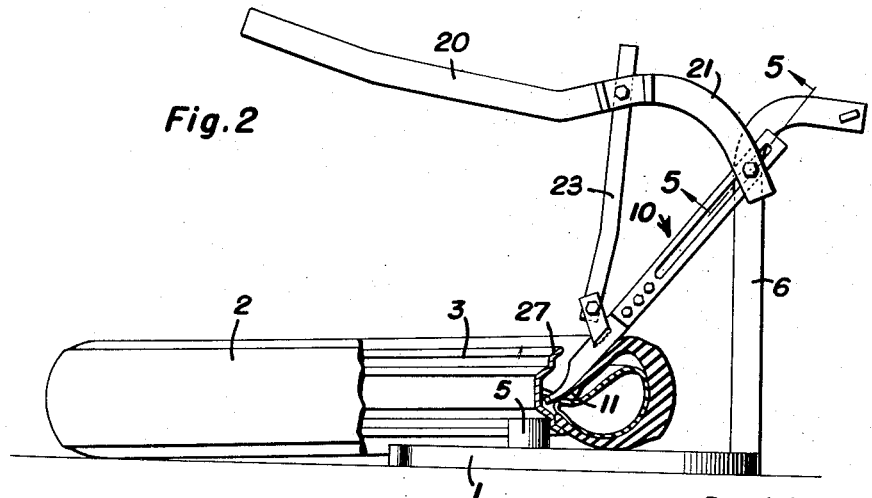
Figure 2 is a similar view of the parts in the position assumed thereby after the bead portion of the tire has been freed.

In using my improved device, the hand lever 20 is swung against the stop lug 8, clockwise as viewed in the drawing, and as shown in dotted lines in Figure 1, out of overlying relation to the base frame 1 and tire 2, this swings the compression lever 10 upwardly into and out of the way position in which it is held by the weight of the end lever 20 resting against the stop lug 8. The base frame 1, and the tire 2 and rim 3 are next arranged, in any convenient manner, so that said frame 1 underlies the tire 2 and rim 3 with the cross-member 5 supporting the rim 3 and the tire resting on its opposite side on a floor, or the like. The hand lever 20 is now swung into overlying relation to the base frame 1 and tire 2 to swing the compression lever 10 downwardly against the uppermost side wall of the tire 2, said lever 10 being manually slid during this operation to position the pressure member 17 adjacent the uppermost bead portion 11. The hand lever 20 is then pressed downwardly to exert pressure against the compression lever 10 through link 23 and thereby cause said portion 17 to press the bead portion 11 adjacent thereto downwardly away from the rim 3, said lever 10 sliding under the pressure exerted thereagainst under the rim flange 27 to facilitate freeing the rim portion from said rim flange. As soon as the pressure member 17 exerts sufficient pressure against the side wall of the tire adjacent the bead portion 11 to provide for the longer lug 18 entering between the rim flange 27 and the bead portion 11, the compression lever slides toward the rim 3 and said lug 18 enters between said flange and bead portion followed by the lugs 19 so that the bead portion 11 is freed from said rim flange completely first at one point and then at closely adjacent point upon opposite sides of the point first freed. As will be seen, after the bead portion is freed in the manner described, the compression lever during further downward swinging thereof will slide into the rim 3, as shown in Figure 2 and said rim will thereby stop further downward swinging of said lever 10. Of course the tire 2 and rim 3 must be rotated so that the bead portion 11 may be freed all around the tire, and said tire then inverted for freeing the bead portion of the other side of the tire.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claim.

Having described my invention, what is claimed as new is:

In a device for freeing the bead portion of a tire from the flanged edge of a rim, a base frame for positioning under a horizontally disposed tire and rim at one side thereof to support the same, a post rising from said base outwardly of the tire, a tire compression lever pivoted adjacent one end on said post for swinging into downwardly inclined position to engage its other end with the uppermost side wall of the tire adjacent the bead portion thereof, a hand lever pivoted on the pivot of said compression lever for downward swinging, a link having an upper end pivoted to said hand lever and a lower end pivoted to said compression lever between the pivot and said other end of the compression lever and extending at an angle from said compression lever and hand lever to exert downward pressure against said compression lever and swing the same downwardly when said hand lever is swung downwardly, and a longitudinal slot in said compression lever traversed by the pivot of said compression lever and slidably connecting said compression lever to its pivot for endwise sliding downwardly and inwardly under the rim flange upon downward movement of the hand lever.

DOMINIC A. ZAFFINA.

References Cited in the file of this patent

UNITED STATES PATENTS

| Number | Name | Date |
| --- | --- | --- |
| 2,311,789 | Taylor | Feb. 23, 1943 |
| 2,433,113 | Graves et al. | Dec. 23, 1947 |
| 2,449,960 | Toles | Sept. 21, 1948 |
| 2,474,926 | York | July 5, 1949 |
| 2,534,950 | Butterfield et al. | Dec. 19, 1950 |